United States Patent [19]

Narumiya

[11] Patent Number: 4,896,146
[45] Date of Patent: Jan. 23, 1990

[54] COLOR IMAGE PROCESSOR

[75] Inventor: Masao Narumiya, Shiki, Japan
[73] Assignee: Sharp Kabushiki Kaisha, Osaka, Japan
[21] Appl. No.: 320,895
[22] Filed: Mar. 10, 1989

Related U.S. Application Data

[63] Continuation of Ser. No. 42,017, Apr. 24, 1987, abandoned.

[30] Foreign Application Priority Data

Apr. 30, 1986 [JP] Japan ................... 61-101646

[51] Int. Cl.⁴ ................................. G09G 3/00
[52] U.S. Cl. ................... 340/701; 340/703; 340/798; 358/78
[58] Field of Search ............... 340/701, 703, 798, 799; 358/75, 78

[56] References Cited

U.S. PATENT DOCUMENTS

| | | |
|---|---|---|
| 3,975,761 | 8/1976 | Taudt et al. |
| 4,454,537 | 6/1984 | Okada et al. ........................ 358/78 |
| 4,605,957 | 8/1986 | Yamada ............................... 358/78 |
| 4,625,234 | 11/1986 | Yamada ............................... 358/78 |
| 4,673,972 | 6/1987 | Yokomizo ............................ 358/78 |
| 4,723,226 | 2/1988 | McDonough et al. ............. 340/799 |

FOREIGN PATENT DOCUMENTS

| | | |
|---|---|---|
| 2948369 | 6/1980 | Fed. Rep. of Germany . |
| 3401236 | 7/1984 | Fed. Rep. of Germany . |
| 3426531 | 2/1985 | Fed. Rep. of Germany . |
| 1554907 | 10/1979 | United Kingdom . |
| 2050109 | 12/1980 | United Kingdom . |
| 2113039 | 7/1983 | United Kingdom . |

OTHER PUBLICATIONS

Siemens article, dated Feb. 11, 1978 (German), Mylarch, Gandhi: Anschluss einer mit dem Baustein SAB 8275 aufgebauten Bildschirmsteuerung an ein MC-System, in: MC-Bausteine-Mitteilung, Siemens AG Munchen, 2nd Nov. 1978, pp. 1–27.

German Lay-Open Print (publication) No. 2,931,420 Al Feb. 14, 1980.

Primary Examiner—David K. Moore
Assistant Examiner—Jeffery A. Brier
Attorney, Agent, or Firm—Birch, Stewart, Kolasch, & Birch

[57] ABSTRACT

A color processor which first writes each line of color data into a frame memory on the receipt of the color data from the color scanner which optically scans the color document and reads red, green, and blue components that are resolved from an individual picture element. Then, the processor reads color data before printing out the color image data via the color printer unit comprising the following elements: a memory controller, which controls the frame memory and incorporates a writing address counter and a reading address counter; an address controller which controls the writing/reading address counters; a timing circuit which controls the operations of the frame memory and the address controller by applying the predetermined drive timing; and unit for providing the timing circuit with predetermined drive timings in order that the reading of each line of color data can be synchronized with the writing of color data into the frame memory by the data-write and data-read timing clocks.

9 Claims, 4 Drawing Sheets

Memory 1,2,3 $\overline{RAS}$
Memory 1 $\overline{CAS}$
Memory 2 $\overline{CAS}$
Memory 3 $\overline{CAS}$ Address counter
in the memory
scanning direction $\overline{RAS}$ Memory 1 $\overline{CAS}$
Memory 2 $\overline{CAS}$
Memory 3 $\overline{CAS}$

COLOR IMAGE PROCESSOR

This application is a continuation of application Ser. No. 07/042,017 filed on Apr. 24, 1987, now abandoned.

BACKGROUND OF THE INVENTION

The present invention relates to a color image processor for use with color facsimiles, color scanner printers, electrophotographic color copying machines, or the like.

Conventional color image processing circuits can only execute print-out operations after completing the scanning operations for reading the contents of color documents. Furthermore, a number of colors including yellow, magenta, cyan, and black must individually be printed out on the printing paper when processing each color document, thus requiring a relatively long period of time to complete the printing operation. To compensate for this, accelerating the printing speed of the color image processors presently available is one solution to this problem. However, it is quite difficult to significantly accelerate either the scanning speed (to read the color image from the original color document) or the printing speed of these conventional processors.

SUMMARY OF THE INVENTION

The primary object of the present invention is to provide a novel color image processor for executing color image processing operations at significantly faster speeds.

Another object of the invention is to provide a novel color image processor capable of independently controlling the color image reading and printing operations so that color image processing can be done at a significantly faster speed.

This invention achieves a significantly faster execution of color image reading and printing operations by providing a novel color image processor having a greatly simplified construction which reads color images while simultaneously writing color data into frame memory rather than achieving a faster execution of the scanning and printing operations themselves. It is thus possible for the processor related to this invention to save a significant amount of time when executing color image processing operations by performing reading and printing operations at the same time.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from the following detailed description.

To achieve the above object, the color image processor relating to the present invention writes each line content of color data received from the color scanner (which optically scans and reads the content of the color document by analyzing one picture element into red, green, and blue components) into the frame memory. The controller then reads this data from the frame memory before the color printer prints out the complete color image.

The color image processor related to the invention is provided with: a writing address counter and a reading address counter; an address controller controlling these counters; and a timing circuit which controls the drive timing of the address controller, in the memory controller which controls the frame memory. Based on the data-writing timing clock pulse and the data-reading timing clock pulse, the timing circuit receives a specific drive timing that is needed for synchronously reading one line of data with line writing of one line data into the frame memory.

As mentioned above, the color image processor related to the invention incorporates data-writing and data-reading address counters which select addresses for the frame memory in the memory controller which controls the frame memory. Thus, by virtue of the above constitution, the memory controller synchronously reads color data from the frame memory with the writing of color data into the frame memory and allows the printer to effectively commence the printing operation before the reading of the entire contents of the original color document is completed by the scanner.

BRIEF DESCRIPTION OF THE DRAWINGS

The present invention will be better understood from the detailed description given hereinafter and the accompanying drawings which are given by way of illustration only, and thus are not limitative of the present invention wherein:

FIG. 7 (b) is an operational flowchart denoting the timing of the signals shown in FIG. 7 (a) in detail.

DESCRIPTION OF THE PREFERRED EMBODIMENTS

Before describing one of the preferred embodiments of the color image processor relating to the present invention, the simplified block diagram denoting the entire elements of the color image processor relating to the invention is referred to in FIG. 3, an outline of the invention is given below.

Figure 3:
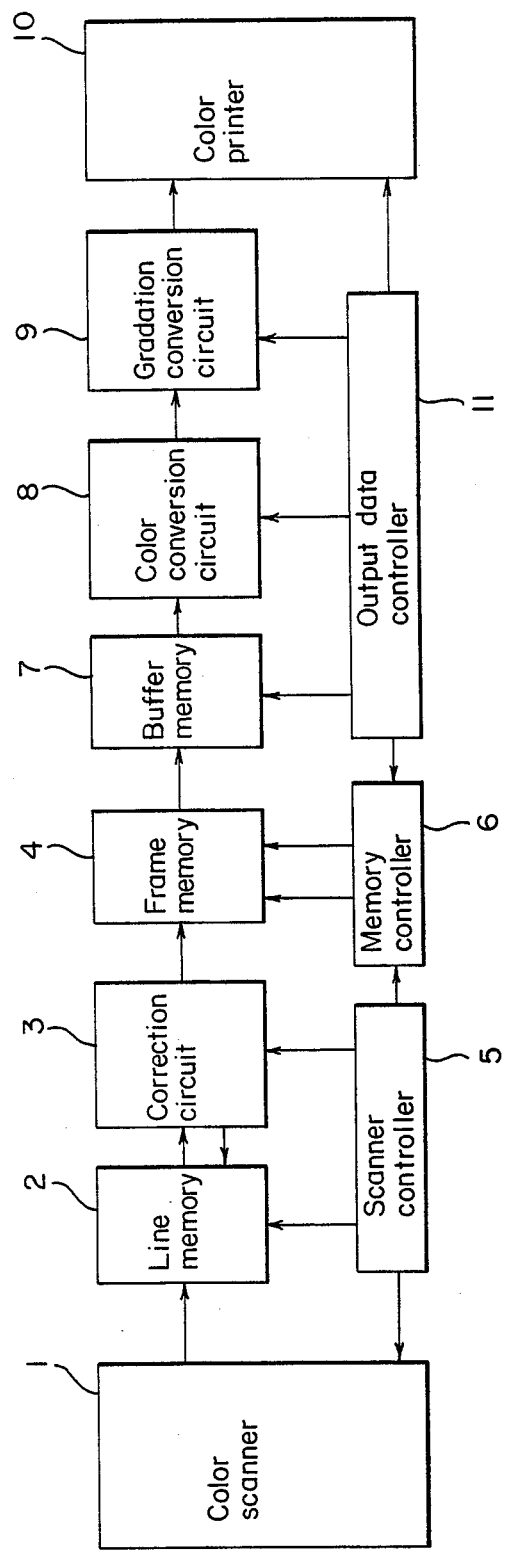
FIG. 3 is a simplified schematic diagram denoting the entire elements of a conventional color image processor relating to the invention.

Generally, a conventional color image processor is constituted as shown in FIG. 3. A color scanner 1 lights up three fluorescent lamps sequentially, which have the spectral radiation characteristics of red, green, and blue components for radiating beams (from the three color light sources having specific radiation spectra) against the color document reading position. As a result, the reflected light corresponding to the spectral radiation characteristics of each of the three color light sources is directed to the CCD image sensor for a photo-electric conversion. Next, based on the predetermined resolution of one picture element into red, green, and blue components, the color scanner 1 reads the original color document one line at a time and a line memory 2 stores the one line of color data being read, which is then delivered to a correction circuit 3 for various processes and corrections. The red, green, and blue components of the one line of color data are then written into the predetermined address of a frame memory 4 before the color scanner 1 reads the next one line of color data. A scanner controller 5 and a memory controller 6 control the timing of for writing the color data read by the color scanner 1 into the frame memory. When all of the color data, including red, green, and blue components of the original color document and its predetermined size, is stored in the frame the memory 4, the memory controller 6 reads each bit of red, green, and blue data from the identical addresses in separate areas of the frame memory 4. After temporarily storing the one line of color data in a buffer memory 7, a color conversion circuit 8 converts red, green, and blue data into the yellow, magenta, cyan, and black data that is necessary for the printing operation. This converted color data is then delivered to an area-gradation/depth-gradation conversion circuit 9, where the color data is converted into data signals having a predetermined gradation depth pattern, via the dither matrix for example, before being delivered to the thermal head of a color printer 10. Finally, by the timing control of an output data controller 11, data signals from the gradation conversion circuit 9 are sequentially applied in synchronous with the operating timing of the color printer 10, so that yellow, magenta, cyan, and black colors are sequentially printed on the color printing paper.

Referring now more particularly to FIGS. 1, 2, 4, 5, 7 (a) and 7 (b), one of the preferred embodiments of the color image processor relating to the invention is described below.

Figure 1:
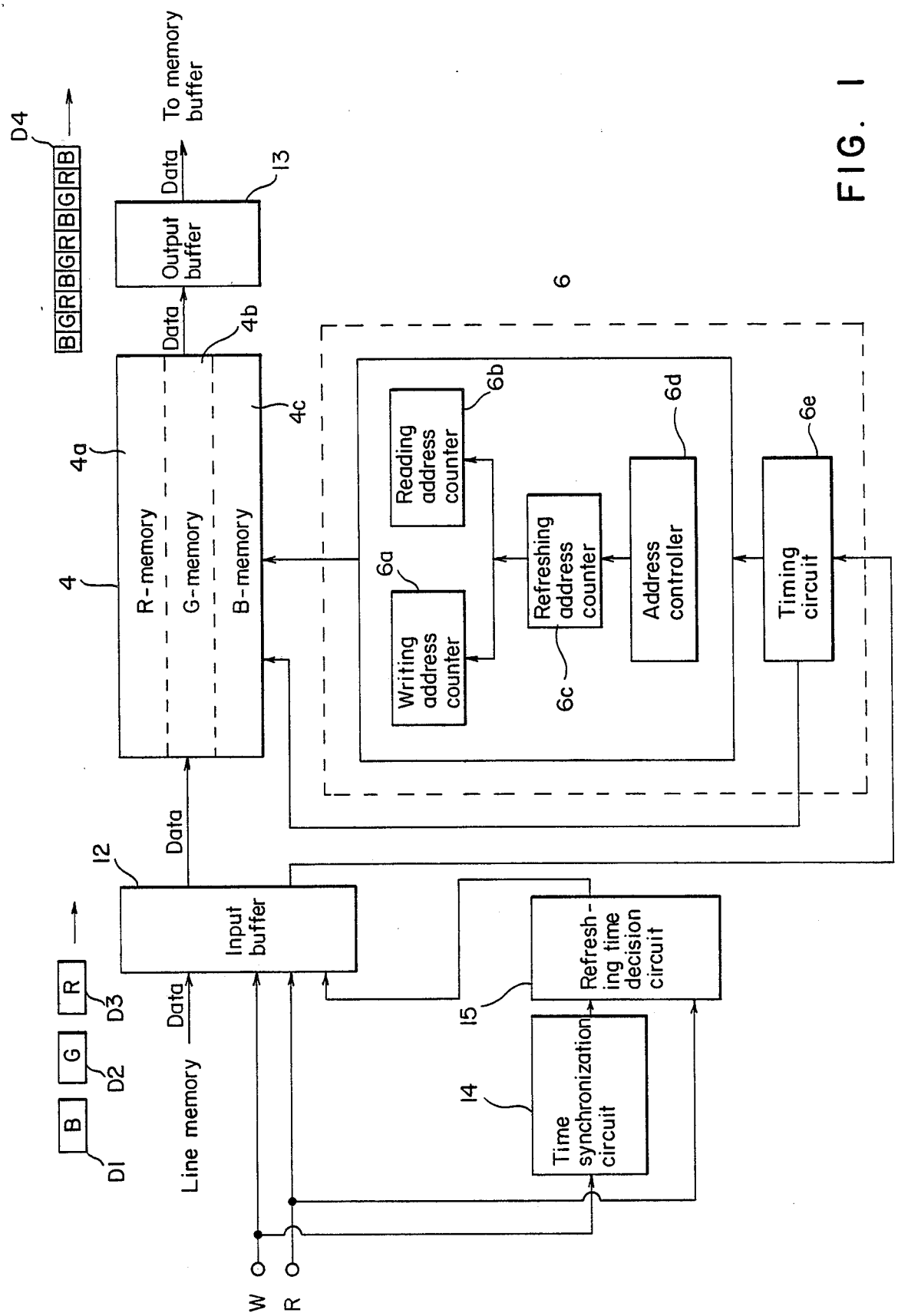
FIG. 1 is a simplified block diagram denoting the essential elements of the color image processor relating to the invention.
Figure 2:
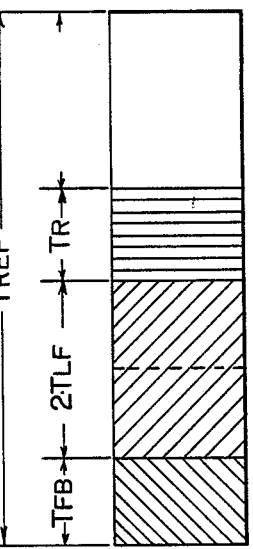
FIG. 2 is a chart denoting a timewise division of operations in one cycle of the refresh cycle time of the frame memory.

FIG. 1 is the simplified block diagram of the essential elements of a preferred embodiment of the color image processor relating to the invention. The diagram denotes a frame a memory 4, memory controller 6, and peripheral components. The frame memory 4 is substantially comprised of a dynamic RAM incorporating an R-memory 4a, a, G-memory 4b and a B-memory, 4c, for respectively storing red, green, and blue component data that are read from the original color document through photolysis. The row of writing data D1, D2, and D3, each containing one line of red, green, and blue component data, is written into memories 4a, 4b and 4c via an input buffer 12, whereas the row of reading data D4 is read by the buffer memory 7 via an output buffer 13.

The memory controller 6 for controlling the frame memory 4 incorporates a writing address counter 6a and a reading address counter 6b for selecting addresses of the frame memory 4. As mentioned above, since the frame memory 4 is substantially comprised of a dynamic RAM, the memory controller 6 is provided with a refresh address counter 6c. In addition, the memory controller is also provided with an address controller 6d for controlling the address counters 6a through 6c, and a timing circuit 6e for controlling the timing operation of these address counters.

To provide the timing circuit 6e with an external drive timing, a data-writing timing clock pulse W is delivered to a timing synchronization circuit 14. The clock pulse that is output from the timing synchronization circuit 14 and a data-reading timing clock pulse R are delivered to a refresh time decision circuit 15. The signal that is output from the refresh time decision circuit 15 is then delivered to the timing circuit 6e via the input buffer 12 together with the data-writing timing clock pulse W and the data-reading timing clock pulse R in order for the control signals which controls the operations for writing and reading data into and out of the frame memory 4 and the timing which refreshes memories 4a through 4c that are synchronized.

Next, the functional operation of one of the preferred embodiments of the color image processor relating to the invention is described below.

First, the row of writing data D1, D2, and D3 (respectively containing one line of red, green, and blue component data and synchronized with the data-writing timing clock pulse W output from the line memory 2) is sent via the input buffer 12 and stored in specific addresses designated by the data-writing address counter 6a of the memories 4a through 4c which are operated by timing control signals from the timing circuit 6e. When data which corresponds to an adequate number of lines is written into the frame memory 4, the data corresponding to one picture element (the preferred embodiment uses 18-bit data) is read out of each of the identical addresses of the memories 4a through 4c that are designated by the data reading address counter 6b which is operated by the timing control signal from the timing circuit 63. Then, as shown in FIG. 1, color data of red, green, and blue components is sequentially read by the color scanner 1 into a data-row D4 before being delivered to the buffer memory 7. In this way, writing and reading color data into and out of the frame memory 4 is properly executed.

Next, the timing needed for writing and reading color data into and out of the frame memory 4 is described below. Assume that time Ts is needed for reading, and time Tp is needed for printing out the one-page content of the original color document. If the time relationship is Tp≧Ts, data reading may begin from the moment at which the data is completely written into the frame memory 4 after one line of color data has been read by the color scanner 1, so that the color printer is enabled to simultaneously begin the color printing operation. On the other hand, if the time relationship is Tp≦Ts, the color scanner 1 may begin to read the color data from the frame memory 4 after a certain time (corresponding to Ts−Tp+Tw) has elapsed after the moment at which the color scanner 1 begins to read the color data. Note the frame memory 4 after a certain time (corresponding writing of one line of color data from the color scanner 1 into the frame memory 4. The color scanner 1 reads the original color document at a constant speed, and the color printer also executes the color printing operation at a constant speed.

The preferred embodiment of the color image processor relating to the invention allows the area-gradation/-depth-gradation conversion circuit 9 to output color data of red, green, and blue components corresponding to one picture element which is composed of 6-bit data, through a 4×4 dither matrix. Thus, before the color printer 10 completes printing of the four lines of color data, the controller system fully reads one line of color data from the frame memory 4 and writes it into the buffer memory 7. The controller system reads only one line of data from the frame memory while four lines of color data are being printed out. Therefore, in relation to the data writing operation executed by the color scanner 1, a certain time allowance is provided, when reading data from the frame memory 4. As a result, it is possible for the system to give a higher priority to the data writing than the data reading operation. However, data writing and data reading into and out of the frame memory 4, and the refresh of the R-memory 4a, G-memory 4b, and B-memory 4c, are synchronously executed with each other.

Next, referring more particularly to the signal operation flowchart, the color image reading and writing operations are described below.

Figure 4:
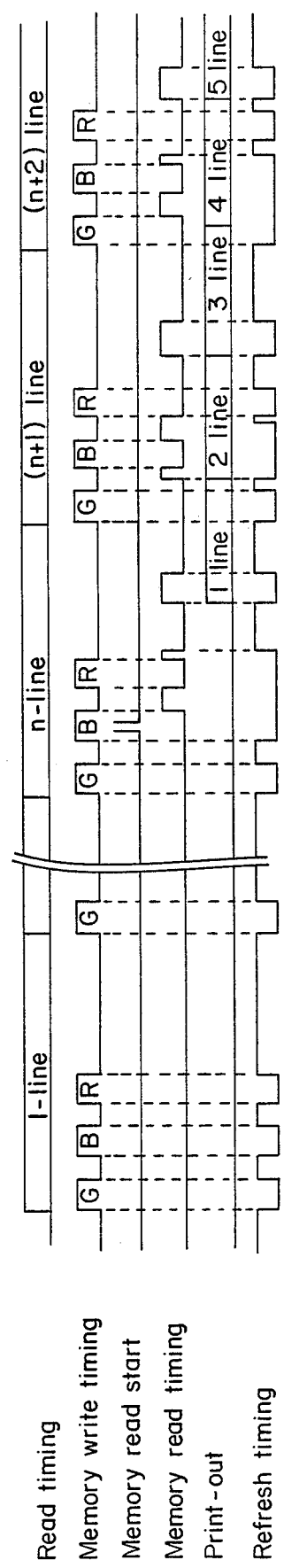
FIG. 4 is an operational flowchart of signal performances used for the color image processor relating to the timing of the invention.
Figure 5:
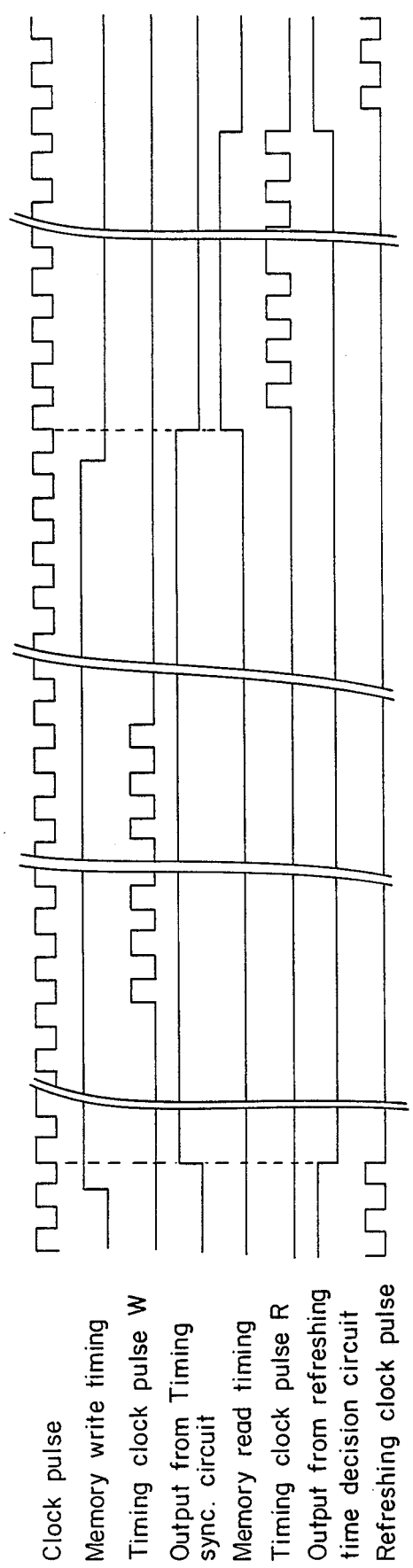
FIG. 5 is the operational flowchart of signals in the (n+2) line related to the scanner reading timing shown in FIG. 4.

FIG. 4 is the signal flowchart used for operating the color image processor relating to the invention. FIG. 5 is the signal flowchart showing the detail of (n+2) line of the data-reading timing of the color scanner 1 shown in FIG. 4.

While the one line of data reading timing is still present, memory write timing for G-data, B-data, and R-data is synchronously generated with the light-emitting time of the fluorescent lamps. The timing clock pulse W to be written into the memory is generated while the memory-write timing is still present as shown in FIG. 5. When the memory-read start-up signal is generated, a memory-read state is entered. As shown in FIG. 4, then memory-write timing precedes the memory-read timing. As shown in FIG. 5, the memory read timing clock pulse R is generated immediately after the inception of the memory read timing. The memory-write timing is not synchronous with clock pulses. Since the timing clock pulse R and the refresh clock pulse have a direct relationship with the memory-write timing signal, this signal is fully synchronized with clock pulses via the timing shychronization circuit, as shown in FIG. 5.

Figure 6:
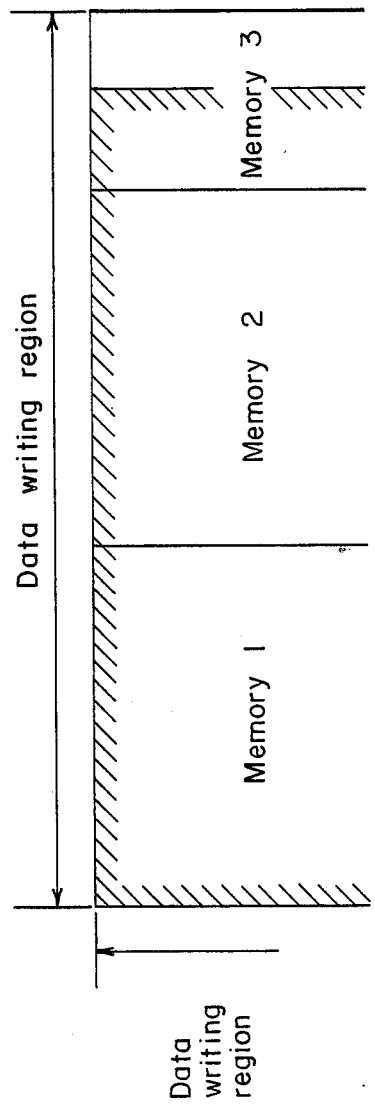
FIG. 6 is a simplified chart denoting part of the data writing or reading (into or from memory) region.
Figure 7A:
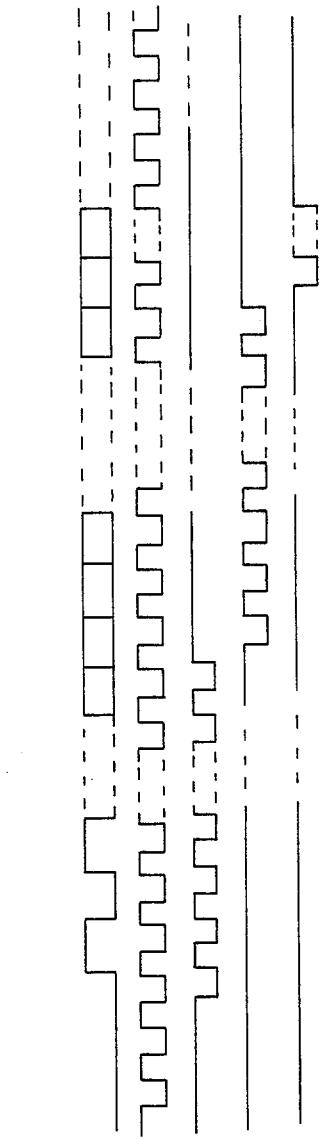
FIG. 7 (a) is a flowchart which compares signals RAS and CAS stored in memories 1, 2, and 3 shown in FIG. 6 to the memory region shown in FIG. 6.
Figure 7B:
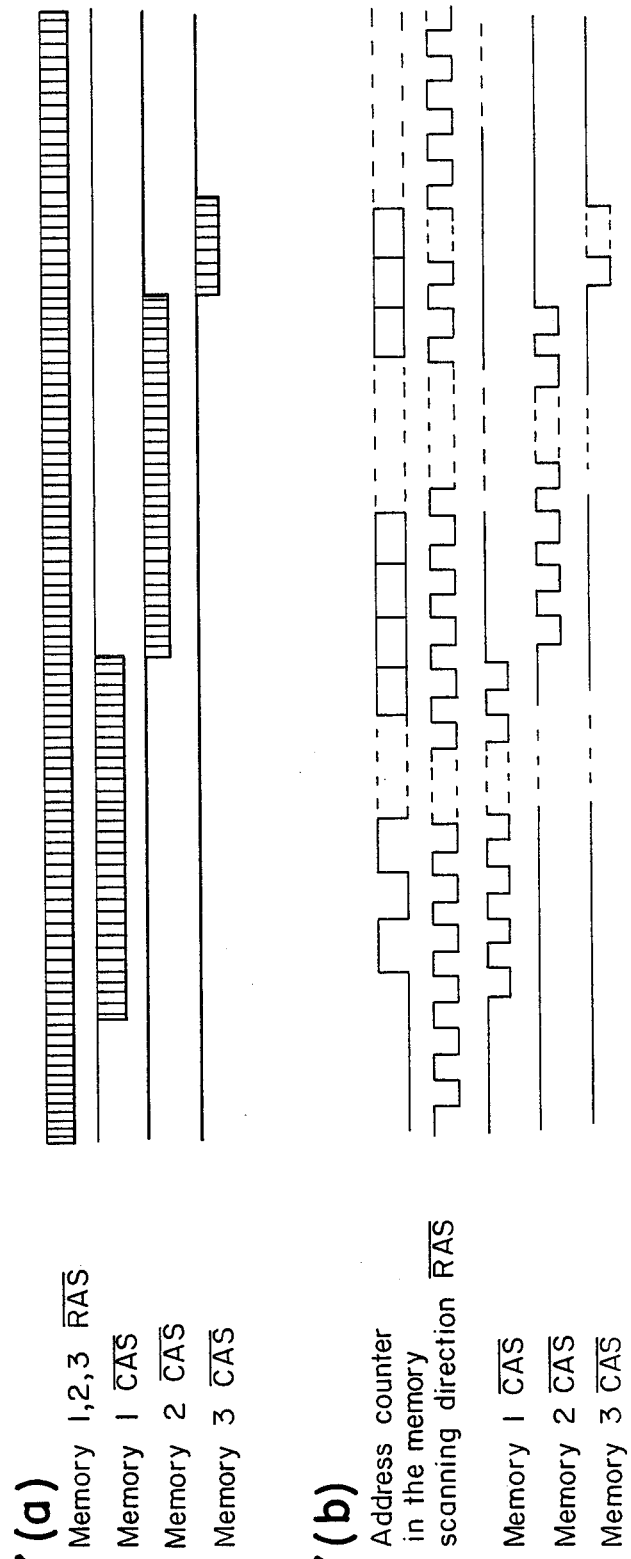

The refresh time is substantially the sum of the memory-write timing and the memory-read timing. Clock pulses that are output from the refresh time decision circuit are shown in FIG. 5. FIGS. 6, 7 (a) and 7 (b) are signal flowcharts showing the operations of clock pulses output from the timing circuit 6e. The preferred embodiment of the color image processor relating to the invention uses 42 units of 256K bit dynamic RAM for frame memories. Signal CAS either writes or reads color data into or out of these memories in a predetermined order. To achieve this function, signal CAS is allocated to each memory by referring to the values from the memory-write address counter or the memory-read address counter. The timing circuit 6e switches these address counters in order to additionally provide these memories with values of the refresh address counter while the refresh cycle is in progress. FIG. 6 denotes part of the region used for executing either data-writing or data-reading into or out of these memories. FIG. 7 (a) denotes the timing for one line of signals $\overline{RAS}$ and $\overline{CAS}$ in order that these signals in of memories 1, 2 and 3 are shown in FIG. 6. and can be compared with the memory region as shown in FIG. 6. FIG. 7 (b) is the signal flowchart representing the timings of FIG. 7 (a) shown in detail.

Next, by referring to the figures obtained by our tests, we will verify the capability of the color image processor relating to the invention for simultaneously executing the scanning operation (for reading color document) and the print-out operation.

Test results prove that the cycle for reading one line of color data from frame memory 4, (i.e., the time needed to complete printing of four lines of color data) is longer than the refresh cycle time $T_{REF}$ applied to the frame memory 4 (which is comprised of a dynamic RAM). In other words, one cycle of the time $T_{FB}$ that is needed for reading one line of color data is present during one refresh cycle time $T_{REF}$. However, the preferred embodiment of the color image processor relating to the invention provides for a maximum for two cycles of the writing cycle. Assume that the time needed for writing one line of color data (single color) is $T_{LF}$ and the time needed to refresh the dynamic RAM in the frame memory 4 is $T_R$, then, a specific relationship denoted by $T_{FB}+2T_{LF}+T_R \leq T_{REF}$ should be established. In other words, a certain time allowance should be included in the refresh cycle time $T_{REF}$. In the color image processor relating to the invention, (256) bit dynamic RAMs are incorporated for the frame memory 4, and $T_{REF}=4ms$, $t_{LP}$ (specific duration of time required for reading 1 bit of data from the frame memory)=0.5μs, and $T_R=256\times 0.5\mu s$. Substitution of these values into the expression above gives the expression $N\times 0.5\mu s + 2\times 0.84 ms + 128\mu s \leq 4$ ms. Therefore, $N \leq 4384$ bits. Note that N denotes the number of bits in one line of data, thus allowing the relationship $T_{FB}=N\cdot t_{LP}$ to be established.

When applying the 1.143 MHz frequency of the data-write timing clock, it is possible for the memory controller to transmit data corresponding to a maximum of 960 clocks (0.84 ms × 1.143 MHz) into the frame memory 4 within the time $T_{LF}$ needed for writing one line of color data. When writing data related to three colors, the memory controller can write 960×3=2,880 clocks of color data. Since 2,880<4,384, even when reading and printing the maximum number of picture elements, the preferred embodiment of the color image processor relating to the invention can simultaneously execute both the scanning operation and the print-out operation.

As is apparent from the above description of the color image processor relating to the invention, the memory controller for controlling the frame memory incorporates data-writing and data-reading address counters for selecting addresses of the frame memory, which allows one line of color data to be properly written into and read out of the frame memory. The color image processor relating to the invention can achieve extremely efficient and time-saving operations in which the time required for reading and printing a color document is drastically reduced by using a simplified constitution, without directly accelerating either the speed for reading the document or the speed for the print-out operation.

While only certain embodiments of the present invention have been described, it will be apparent to those skilled in the art that various changes and modifications may be made therein without departing from the spirit and scope of the present invention as claimed.

What is claimed is:

1. A color image processor for synchronously writing color data into a frame memory and reading said color data from said frame memory comprising:
    color scanning means for sequentially scanning a plurality of lines of color data from a color document;
    timing control means for developing a data timing signal in response to an external write signal and an external read signal;
    writing address controlling means for writing each line of said plurality of lines of color data from said color scanning means, in synchronism with said data timing signal, at a plurality of addresses in said frame memory by generating said plurality of addresses for each line of said plurality of lines; and reading address controlling means for generating said plurality of addresses for reading said plurality of lines of color data from said frame memory in synchronism with said data timing signal in response to a predetermined number of lines of said plurality of lines being written into said frame memory.

2. The color image processor of claim 1, wherein said frame memory is a dynamic RAM.

3. The color image processor of claim 1, wherein said frame memory comprises first, second and third memory components.

4. The image processor of claim 3, wherein said first memory component is a red memory component, said second memory component is a green memory component and said third memory component is a blue memory component.

5. The image processor of claim 1, wherein each line of said plurality of lines of color data comprises a red data component, a green data component and a blue data component.

6. The image processor of claim 1, wherein said timing means comprises timing synchronization means and refresh time decision means for generating said data timing and read signals in response to said external write signal.

7. The image processor of claim 1, wherein said writing address controlling means comprises a writing address counter for selecting said addresses in said frame memory for writing each line of said plurality of lines.

8. The image processor of claim 1, wherein said reading address controlling means comprises a reading address counter for determining said addresses for reading said plurality of lines from said frame memory.

9. A method for synchronously writing color data into a frame memory and reading said color data from said frame memory in a color image processor comprising the steps of:

sequentially scanning a plurality of lines of color data from a color document by color scanning means;

developing a data timing signal in response to an external write signal and an external read signal by timing control means;

writing each line of said plurality of lines of color data from said color scanning means in synchronism with said data timing signal at a plurality of addresses in said frame memory by generating said plurality of lines by writing address controlling means; and generating said plurality of addresses for reading said plurality of lines of color data from said frame memory in synchronism with said data time signal in response to a predetermined number of lines of said plurality of lines being written into said frame memory by reading address controlling means.

* * * * *